(No Model.)

C. A. TATUM.
CLAMP FOR FLEXIBLE TUBES.

No. 350,850. Patented Oct. 12, 1886.

WITNESSES:
A. Schehl.
Gustav Schneppé.

INVENTOR
Chas. A. Tatum
BY
Briesen & Steele
ATTORNEYS.

UNITED STATES PATENT OFFICE.

CHARLES A. TATUM, OF NEW YORK, N. Y., ASSIGNOR TO WHITALL, TATUM & CO., OF SAME PLACE.

CLAMP FOR FLEXIBLE TUBES.

SPECIFICATION forming part of Letters Patent No. 350,850, dated October 12, 1886.

Application filed February 12, 1886. Serial No. 191,780. (No model.)

*To all whom it may concern:*

Be it known that I, CHARLES A. TATUM, of New York city, county and State of New York, have invented an Improved Clamp for Flexible Tubes, of which the following is a clear and exact description, reference being had to the accompanying drawings.

Figure 1:
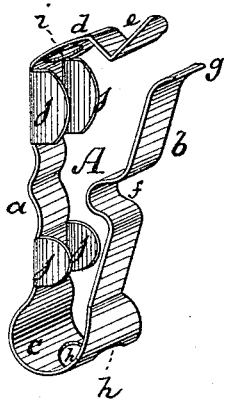
Figure 2:
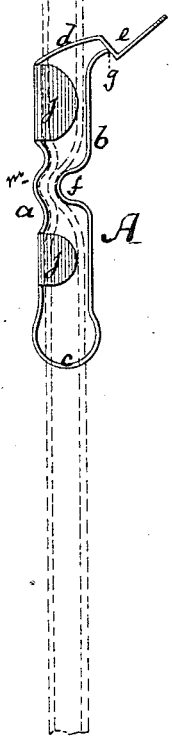
Figure 3:
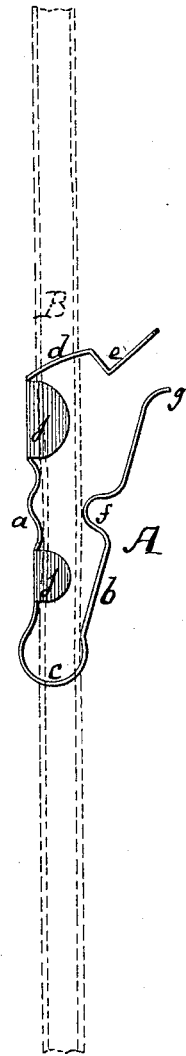

Figure 1 is a perspective view of my improved clamp for flexible tubes. Fig. 2 is a side view of the same, showing it closed on a tube. Fig. 3 is a side view of the same, showing it opened on a tube.

This invention has for its object the production of a convenient clamp for embracing and more or less contracting flexible tubes of the kind used in chemical laboratories, on syringes and the like.

The invention consists, principally, in making such a clamp of a piece of metal of the form hereinafter described. The said clamp has both its free ends shaped to form a convenient catch in such manner that a pressure of one finger will cause the clamp to compress the flexible tube to a greater or less extent. The clamp is also preferably provided with lips or flanges at the sides, to keep the tube straight in the clamp while folded away when not in use.

A in the drawings is the improved clamp. It is made of one piece of sheet metal or analogous material, of the form shown in Fig. 1. It forms two main parts or arms, $a$ and $b$, which are united by the bent piece $c$, that constitutes a spring-connection. The part or arm $a$ connects at its free end with a bent piece, $d$, which terminates in an L-shaped or angular handle, $e$. The other part or arm, $b$, is bent at or near its middle toward the part or arm $a$, forming a bulge, as shown at $f$. The free end of the part or arm $b$ is by preference turned slightly outward, as shown at $g$. A hole, $h$, is in the spring-connection $c$, and a similar hole, $i$, in the bent piece $d$. One of the two arms or parts $a$ $b$, or both, may be provided with projecting side lips, $j j$. The tube B, of india-rubber or other flexible material, is put through the holes $h$ $i$ and confined between the lips $j j$. When the clamp is open, as in Fig. 3, the bulged part $f$ of the free arm $b$ does not compress the tube. A gentle touch of the finger against the arm $b$ will cause the bulged part $f$ to compress the tube B to the desired extent. This compression can be regulated with great nicety to insure a stream through the tube of the exact proportions desired. When the free end $g$ of the arm $b$ is pressed under the L-shaped handle $e$, as in Fig. 2, the tube will be fully compressed. In this position the parts $e$ and $g$ constitute a catch for holding the tube B properly compressed and closed. To open the catch the handle $e$ is sprung off the end $g$, whereupon the spring $c$ will throw the clamp open into the position shown in Fig. 3.

The bulge $f$ may be on the arm $a$, if desired, without changing the principal features of my invention. The hole $h$ in the bent connection $c$ renders the latter more elastic, so that it constitutes a reliable spring.

It will be seen that the entire clamp can be made of one piece of metal, which is an advantage; but I do not limit myself to making it of one piece, as several pieces may be joined together to produce the same effect; for example, the bulge $f$ may be produced by a solid plug soldered to the inner face of the arm $b$ or $a$. The clamp, it will be seen, is adapted to compress tubes of different sizes of bore, which is a great advantage. Opposite the projecting bulge $f$ on the arm $b$ is a receding bend, $m$, on the arm $a$, so that the tube when compressed will still have its walls substantially parallel.

I claim—

The clamp A, composed of the arms $a$ $b$, perforated spring-connection $c$, bulge $f$ on arm $b$, perforated projection $d$, and handle $e$, and recess $m$ on arm $a$, all arranged to allow the free end $g$ of the arm $b$ to constitute a catch, together with and on the handle $e$, as described.

C. A. TATUM.

Witnesses:
 THOS. J. POWERS,
 CHARLES G. M. THOMAS.